(12) United States Patent
Yu (10) Patent No.: US 7,456,821 B2
(45) Date of Patent: Nov. 25, 2008

(54) USER INTERFACE DEVICE

(75) Inventor: Raymond Yu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 875 days.

(21) Appl. No.: 10/999,064

(22) Filed: Nov. 30, 2004

(65) Prior Publication Data

US 2006/0117258 A1 Jun. 1, 2006

(51) Int. Cl.
*G06F 3/033* (2006.01)

(52) U.S. Cl. .................. 345/161; 345/156; 345/157

(58) Field of Classification Search ......... 345/156–168; 463/37–39; 434/43–49

See application file for complete search history.

(56) References Cited

U.S. PATENT DOCUMENTS

| 3,832,895 A | 9/1974 | Strandh |
| 3,875,488 A | 4/1975 | Crocker et al. |
| 4,459,440 A | 7/1984 | Wiczer |
| 4,652,805 A | 3/1987 | Kohn |
| 4,839,838 A | 6/1989 | LaBiche et al. |
| 5,107,080 A | 4/1992 | Rosen |
| 5,138,154 A | 8/1992 | Hotelling |
| 5,172,092 A | 12/1992 | Nguyen et al. |
| 5,223,776 A | 6/1993 | Radke et al. |
| 5,271,290 A | 12/1993 | Fischer |
| 5,436,640 A | 7/1995 | Reeves |
| 5,473,344 A | 12/1995 | Bacon et al. |
| 5,589,828 A | 12/1996 | Armstrong |
| 5,589,854 A | 12/1996 | Tsai |
| 5,629,594 A | 5/1997 | Jacobus et al. |
| 5,666,138 A | 9/1997 | Culver |
| 5,724,068 A | 3/1998 | Sanchez et al. |

(Continued)

FOREIGN PATENT DOCUMENTS

JP 09-026850 1/1997

(Continued)

OTHER PUBLICATIONS

Ellis, R. E., et al., "Design and Evaluation of a High-Performance Prototype Planar Haptic Interface", DSC-vol. 49, Advances in Robotics, Mechatronics and Haptic Interfaces, ASME 1993, pp. 55-64.

(Continued)

*Primary Examiner*—Vijay Shankar
(74) *Attorney, Agent, or Firm*—Thelen LLP; David B. Ritchie (57) ABSTRACT

A device comprises a manipulandum moveable in at least two degrees of freedom including a first link rotatably moveable about a pivot axis and a second link rotatably moveable about a pivot axis. The first link and the second link are coupled to a ground member. A first actuator is configured to engage the first link and provide an output about a drive axis of the first actuator. A second actuator is configured to engage the second link and provide an output about a drive axis of the second actuator. The drive axis of the first actuator is substantially parallel to the drive axis of the second actuator. The first actuator and the second actuator are each configured to receive a signal associated with a force feedback. The force feedback being associated with the manipulandum.

20 Claims, 4 Drawing Sheets

U.S. PATENT DOCUMENTS

| | | | |
|---|---|---|---|
| 5,731,804 | A | 3/1998 | Rosenberg |
| 5,742,278 | A | 4/1998 | Chen et al. |
| 5,760,764 | A | 6/1998 | Martinelli |
| 5,767,839 | A | 6/1998 | Rosenberg |
| 5,790,108 | A | 8/1998 | Salcudean et al. |
| 5,805,140 | A | 9/1998 | Rosenberg et al. |
| 5,828,197 | A | 10/1998 | Martin et al. |
| 5,828,363 | A | 10/1998 | Yaniger et al. |
| 6,001,014 | A | 12/1999 | Ogata et al. |
| 6,020,875 | A | 2/2000 | Moore et al. |
| 6,036,495 | A | 3/2000 | Marcus et al. |
| 6,088,019 | A | 7/2000 | Rosenberg |
| 6,088,020 | A | 7/2000 | Mor |
| 6,104,382 | A | 8/2000 | Martin et al. |
| 6,184,868 | B1 | 2/2001 | Shahoian et al. |
| 6,256,011 | B1 | 7/2001 | Culver |
| 6,283,859 | B1 | 9/2001 | Carlson et al. |
| 6,339,419 | B1 | 1/2002 | Jolly et al. |
| 6,468,158 | B1 | 10/2002 | Ootori et al. |
| 6,480,185 | B1 | 11/2002 | Kiljander et al. |
| 6,646,632 | B2 | 11/2003 | Wegmuller et al. |
| 2006/0283279 | A1* | 12/2006 | Levin et al. ............ 74/471 XY |
| 2007/0052674 | A1* | 3/2007 | Culver ........................ 345/157 |

FOREIGN PATENT DOCUMENTS

| | | |
|---|---|---|
| JP | 4-034610 | 2/2002 |
| WO | WO 00/03319 | 1/2000 |

OTHER PUBLICATIONS

Millman, Paul A., et al., "Design of a Four Degree-of-Freedom Force-Reflecting Manipulandum with a Specified Force/Torque Workspace," Dept. of Mechanical Engineering, 1991, pp. 1488-1493.

Ouhyoung, Ming et al., "A Low-Cost Force Feedback Joystick and Its Use in PC Video Games," IEEE Transactions on Consumer Electronics, vol. 41, No. 3, Aug. 1995, pp. 787-794.

Pocock, Bruce, "Mini Mouse Uses Resistance Bridging," Useful Technology For Your Idea File, Mar. 15, 2004, www.designnews.com, pp. 1-4.

Ramstein, Christophe et al., "The Pantograph: A Large Workspace Haptic Device for a Multimodal Human-Computer Interaction", Computer-Human Interaction, CHI 1994, 3 pages.

Russo, Massimo Andrea, "The Design and Implementation of a Three Degree of Freedom Force Output Joystick," Dept. of Mechanical Engineering, MIT May 1990, 131 pages.

Schmult, B., et al., "Application Areas for a Force-Feedback Joystick", Department of Machine Perception Research AT&T Bell Laboratories, Holmdel, New Jersey, DSC-vol. 49, Interfaces ASME 1993, pp. 47-54, (1993).

Tadros, Alfred Heikal, "Control System Design for a Three Degree of Freedom Virtual Environment Simulator Using Motor/Brake Pair Actuators," Dept. of Mechanical Engineering, MIT Feb. 1990, pp. 2-88.

* cited by examiner

USER INTERFACE DEVICE

BACKGROUND

The invention relates generally to devices that interface with a computer, and more particularly to a user interface device configured to transfer forces to a user under the direction of a computer.

Devices that provide haptic feedback (also sometimes referred to as "force feedback") to the user are available in a variety of forms and applications to improve the user's perceptual experience when interfacing with a computer. Such haptic feedback can be, for example, vibrotactile or kinesthetic. Force feedback devices have been incorporated into input devices such as computer mice, joysticks, gamepads, steering wheels, button controls, styluses and the like. The type of haptic response or force feedback may depend on the particular application.

Some known force feedback devices, however, are large in size, thus limiting the number of useful applications for those devices. Other known force feedback devices may have smaller components, but have a corresponding lower or limited performance level. Thus, a need exists for a high performing and compact force feedback device for use in applications having limited space requirements for the placement of the device.

SUMMARY OF THE INVENTION

A device comprises a manipulandum moveable in at least two degrees of freedom including a first link rotatably moveable about a pivot axis and a second link rotatably moveable about a pivot axis. The first link and the second link are coupled to a ground member. A first actuator is configured to engage the first link and provide an output about a drive axis of the first actuator. A second actuator is configured to engage the second link and provide an output about a drive axis of the second actuator. The drive axis of the first actuator is substantially parallel to the drive axis of the second actuator. The first actuator and the second actuator are each configured to receive a signal associated with a force feedback. The force feedback being associated with the manipulandum.

BRIEF DESCRIPTION OF THE DRAWINGS

The present invention is described with reference to the accompanying drawings. In the drawings, like reference numbers indicate identical or functionally similar elements.

DETAILED DESCRIPTION

A user interface device according to an embodiment of the invention includes a first link rotatably moveable about a pivot axis and a second link rotatably moveable about a pivot axis, with the first link and the second link being coupled to a ground member. A first actuator is configured to engage the first link and provide an output about a drive axis of the first actuator. A second actuator is configured to engage the second link and provide an output about a drive axis of the second actuator. The drive axis of the first actuator is substantially parallel to the drive axis of the second actuator. The first actuator and the second actuator can each be configured to receive from a computer a signal associated with a force feedback. The force feedback is also associated with a manipulandum.

The term "manipulandum" is used here to mean a component that can be manipulated by a user. A manipulandum can be configured to provide haptic force feedback to a user of an input device, such as a joystick, a knob, a mouse, a steering wheel, a game pad, and the like. A manipulandum can include, for example, a unitarily formed component of an input device such as a joystick, a knob, a mouse, a steering wheel, a game pad and the like, or alternatively can be, for example, separate multiple components of such an input device.

The term "link" is used here to mean a component of the user interface device that is coupled to the manipulandum such that the link affects movement of the manipulandum in at least one direction or one degree of freedom. A link can also constrain a degree of freedom of the manipulandum. A link can be, for example, a component that is sufficiently flexible in one direction (or one degree of freedom), yet providing a high level of stiffness in another direction.

The term "ground member" is used here to mean a mechanical ground within the user interface device relative to which other components within the user interface device are configured to move. In other words, the ground member can include any component within the user interface device configured to be stationary or fixed in relation to a moving component that is coupled to the ground member. For example, the first link and the second link are configured to be mechanically coupled to the ground member and rotate relative to the ground member.

The drive axis of the first actuator is substantially parallel to the drive axis of the second actuator. In one embodiment, the first actuator and the second actuator are each positioned within the user interface device such that the first actuator can drive the first link and the second actuator can drive the second link in two separate planes or separate non-coincident locations and operation of the first link does not interfere with operation of the second link. This configuration allows for a more compact design of the user interface device. The user interface device can be configured, for example, to provide a high level of performance and intensity level to a user within limited space requirements.

Figure 1:
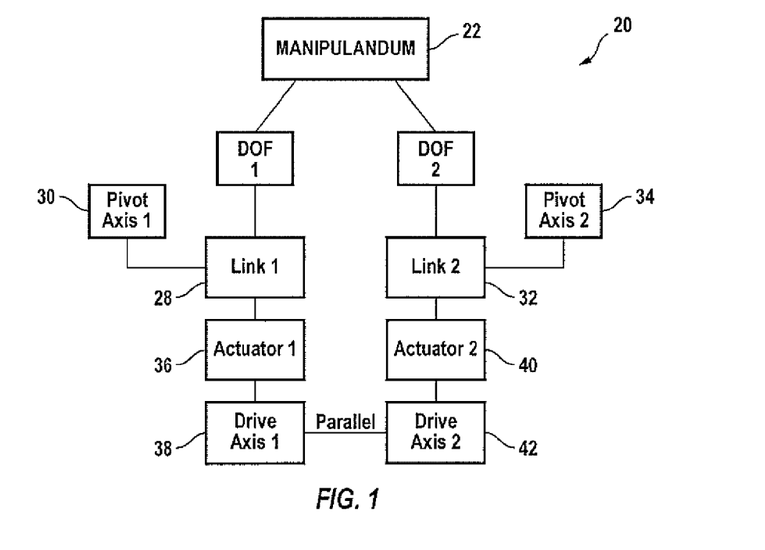
FIG. 1 is a schematic illustrating a rotary interface device according to an embodiment of the invention.

FIG. 1 is a block diagram of a user interface device 20 according to an embodiment of the invention. Device 20 includes a manipulandum 22 moveable in a first degree of freedom (DOF 1) and a second degree of freedom (DOF 2). A first link 28 is rotatably moveable about a pivot axis 30 and is configured to provide one degree of freedom (i.e., DOF 1) to the manipulandum 22. A second link 32 is rotatably moveable about a pivot axis 34 and is configured to provide another degree of freedom (i.e., DOF 2) to the manipulandum 22. The first link 28 and the second link 32 are both coupled to a ground member 24 (not shown). A first actuator 36 is configured to engage the first link 28 and provide an output about a drive axis 38. A second actuator 40 is configured to engage the second link 32 and provide an output about a drive axis 42. The drive axis 38 of the first actuator 36 is substantially parallel to the drive axis 42 of the second actuator 40. The first actuator 36 and the second actuator 40 are each configured to receive a signal associated with a force feedback for the manipulandum 22. When activated, actuators 36 and 40 move or constrain links 28 and 32, which move or constrain movement of manipulandum 22. Thus, the force feedback is associated with the manipulandum 22 in the sense that the activation of actuators 36 and 40 result in force feedback to be provided to manipulandum 22. The first actuator 36 and the second actuator 40 are communicatively coupled to a processor (not shown) configured to receive and/or transmit signals to and/or from the first actuator 36 and the second actuator 40. The first actuator 36 and the second actuator 40 can output force feedback based on signals received from the processor to the manipulandum 22.

Figure 2:
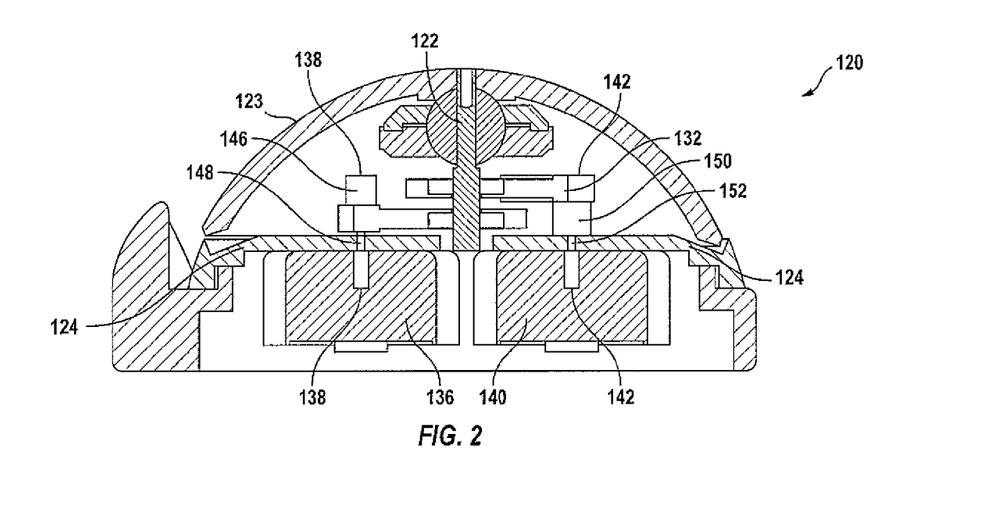
FIG. 2 is a cross sectional view of a user interface device according to an embodiment of the invention.

FIG. 2 is a cross-sectional view of a user interface device according to an embodiment of the invention. A user interface device 120 includes a manipulandum 122 moveable about a first direction or first degree of freedom and a second direction or second degree of freedom, a first link 128 rotatable about a pivot axis 130 (see FIG. 3), a second link 132 rotatable about a pivot axis 134 (see FIG. 3), a first actuator 136, and a second actuator 140. The first link 128 and the second link 132 are each coupled to a ground member 124 (see also FIG. 3) and rotate relative to ground member 124.

As shown in FIG. 2, manipulandum 122 is coupled to a cover member 123. Manipulandum 122 can be a unitarily formed component of an input device such as a joystick, a mouse, a steering wheel, a game pad, and the like, or alternatively can be multiple separate components of such an input device as shown in FIG. 2.

The first actuator 136 is rotatable about a drive axis 138 and is configured to engage the first link 128, and the second actuator 140 is rotatable about a drive axis 142 and is configured to engage the second link 132. As shown in FIG. 2, the drive axis 138 of the first actuator 136 is substantially parallel to the drive axis 142 of the second actuator 140. In this embodiment, the first actuator 136 can drive the first link 128 and the second actuator 140 can drive the second link 132 in two separate planes or separate non-coincident locations such that operation of the first link 128 does not interfere with operation of the second link 132. For example, the first link 128 and the second link 132 can be in parallel planes.

Figure 3:
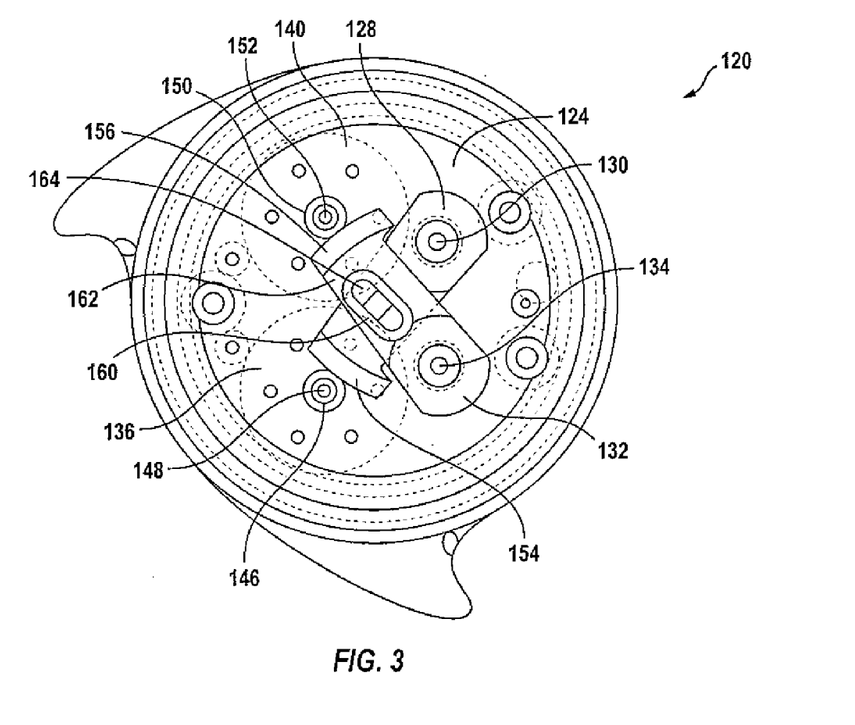
FIG. 3 is a top view of the user interface device depicted in FIG. 2 with a top portion of the device cut-away.

FIG. 3 is a top view of the user interface device 120 shown in FIG. 2 without cover member 123. First link 128 includes a gear portion 154, and second link 132 includes a gear portion 156. In this embodiment, first actuator 136 includes a DC motor having a gear 146 mounted on an output shaft 148 (see also FIG. 2). Second actuator 140 includes a DC motor having a gear 150 mounted on an output shaft 152 (see also FIG. 2). Gear 146 is configured to matingly engage gear portion 154 of first link 128, and gear 150 is configured to matingly engage gear portion 156 of second link 132.

As shown in FIG. 3, first link 128 includes a surface 158 defining an opening 160, and second link 132 includes a surface 162 defining an opening 164. The positioning of first link 128 and second link 132 in separate planes or separate non-coincident locations enables first link 128 and second link 132 to be positioned relative to each other such that at least a portion of opening 160 overlaps at least a portion of opening 164. First link 128 and second link 132 may be constructed of a variety of materials, such as plastic, metal or other suitable material.

In one embodiment, opening 160 and opening 164 can overlap substantially orthogonally in a nominal center of the user interface device 120 as shown in FIG. 3. In another embodiment, opening 160 and opening 164 can be positioned at a different angle relative to each other. In the embodiment shown in FIG. 3, opening 160 and opening 164 each can be substantially oblong shaped. In other embodiments, opening 160 and opening 164 can be circular, rectangular, square or any other suitable shape. In other embodiments, opening 160 and opening 164 can be positioned at a location on first link 128 and second link 132, respectively, other than the nominal center.

In the embodiment shown in FIG. 2, manipulandum 122 extends through opening 160 of first link 128 and opening 164 of second link 132. In this configuration, manipulandum 122 can move in two directions or two degrees of freedom. In other words, during operation, manipulandum 122 can be constrained by opening 160 of first link 128, while being permitted to move freely within opening 164 of second link 132, and can be constrained by opening 164 of second link 132 while being permitted to move freely within opening 160 of first link 128. Input from a user can be transmitted through the manipulandum 122 and to a processor coupled to user interface device 120. Likewise, force feedback signals can be communicated from the processor to the first actuator 136 and the second actuator 140 to provide force feedback to a user via manipulandum 122.

The force feedback output by user interface device 120 and received by a user can have a relatively high intensity level due to two stages of force amplification or mechanical advantage achieved by user interface device 120. First, the user interface device 120 uses a smaller gear to drive a larger gear producing a greater output to the link (although beneficial, it is not necessary). This is illustrated in the top view of the first link and gear of the first actuator shown in FIG. 4. As shown, first link 128 has a radius of rotation greater than the radius of rotation of the gear 146 of the first actuator 136. First link 128 rotates about pivot axis 130 through a radius of rotation R1 and gear 146 rotates about drive axis 138 and has a radius of rotation R2, which is smaller than radius of rotation R1. For purposes of illustration, only first link 128 and gear 146 of first actuator 136 are shown, but it is to be understood that the same principles apply to second link 132 and gear 150 of second actuator 140.

Figure 4:
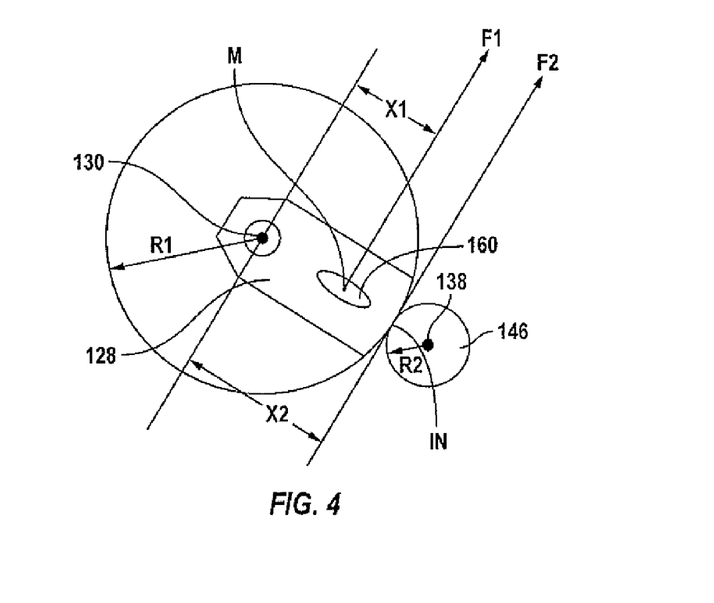
FIG 4 is a partial top view illustrating a user interface device of the invention.

The second stage of mechanical advantage is due to the ratio of a linear distance X1 to a linear distance X2. As illustrated in FIG. 4, linear distance X1 is defined as the linear distance between a location M (the location where the manipulandum is coupled to the first link 128) and the location of the pivot axis 130 of first link 128. Linear distance X2 is defined as the linear distance between an interface location IN (the location where drive gear 146 and gear portion 154 of link 128 engage each other) and the location of the pivot axis 130 of link 128. As can be seen in FIG. 4, X1 is smaller than X2. This dimensional configuration results in a greater force F1 being produced at location M than a force F2 produced at interface location IN. Because a greater force F1 is produced, a lower torque motor may be used to drive the link 128 and still achieve high performance levels. Below are equations for calculating the relevant forces:

$$F1 \times X1 = F2 \times X2;$$

$$X1/X2 = F2/F1; \text{ and}$$

$$\text{If } X2 > X1, \text{ then } F1 > F2.$$

Figure 5:
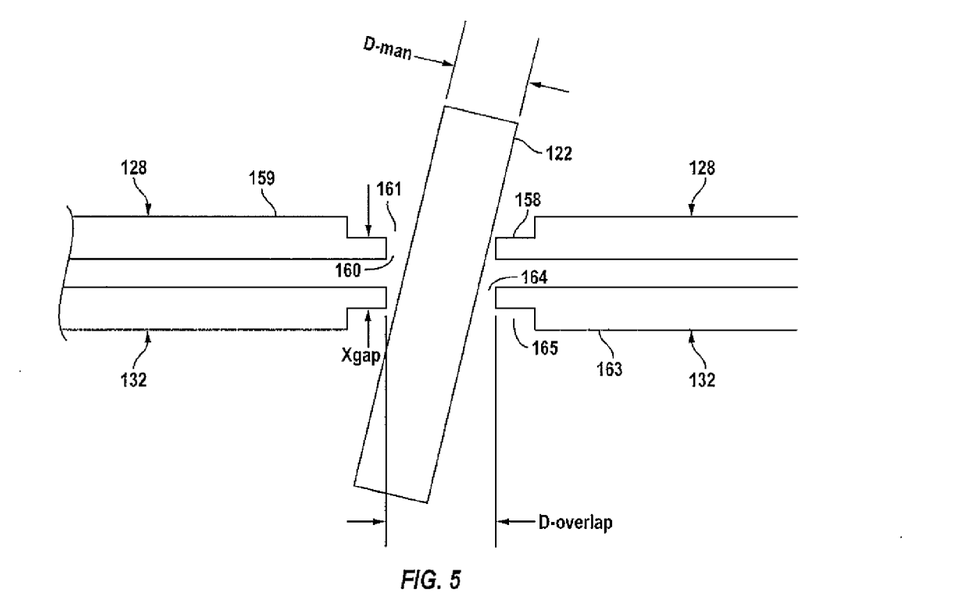
FIG. 5 is a partial side view of a user interface device according to an embodiment of the invention.

FIG. 5 is a partial side view of the user interface device 120 shown in FIGS. 2-4. As shown in FIG. 5, first link 128 can include a first surface 158 defining an opening 160 and a second surface 159 defining an opening 161. Second link 132 can include a first surface 162 defining an opening 164 and a second surface 163 defining an opening 165. The linear distance between first surface 158 of first link 128 and first surface 162 of second link 132 is defined as Xgap. By minimizing Xgap, the angular range or rotation of manipulandum 122 can be maximized and binding of manipulandum 122 can be minimized. The opening defined collectively by the overlap of first link 122 and second link 132 is illustrated as having a diameter D-overlap, and the diameter size of the manipulandum is illustrated as D-man. If the difference between D-overlap and D-man is minimized, the amount of backlash or "slop" of manipulandum 122 during operation of user interface device 120 will be minimized.

Figure 6:
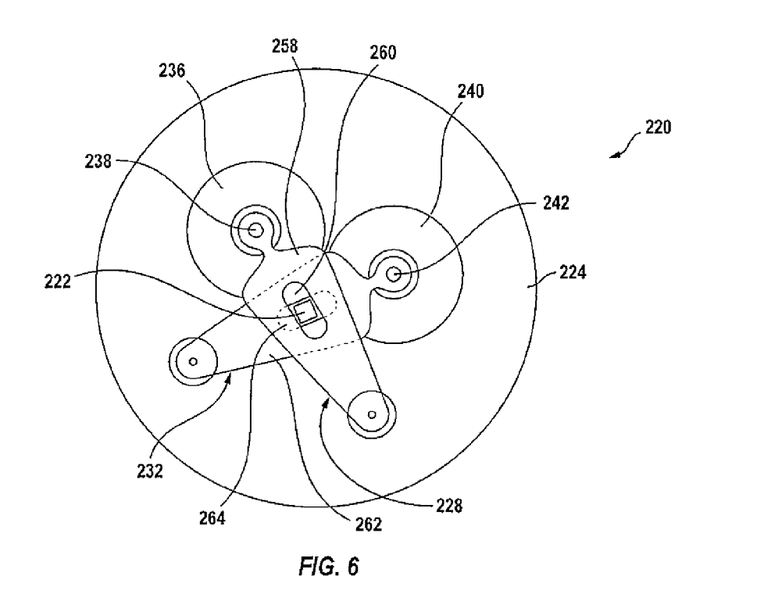
FIG. 6 is a partial top view of a user interface device according to an embodiment of the invention.

FIG. 6 is a partial top view of a user interface device according to an alternative embodiment of the invention. User interface device 220 includes a manipulandum 222 moveable about a first direction or first degree of freedom, and a second direction or second degree of freedom, a first link 228 coupled to a ground member 224, a second link 232 coupled to the ground member 224, a first actuator 236, and a second actuator 240.

The first actuator 236 is rotatable about a drive axis 238 and is coupled to the first link 228, and the second actuator 240 is rotatable about a drive axis 242 and is coupled to the second link 232. The drive axis 238 of the first actuator 236 is substantially parallel to the drive axis 242 of the second actuator 240. In this embodiment, the first actuator 236 can drive the first link 228 and the second actuator 240 can drive the second link 232 in two separate planes, or non-coincident locations, such that operation of the first link 228 does not interfere with operation of the second link 232.

As shown in FIG. 6, first link 228 includes a surface 258 defining an opening 260, and second link 232 includes a surface 262 defining an opening 264. The positioning of first link 228 and second link 232 within separate planes or separate non-coincident locations enables first link 228 and second link 232 to be positioned relative to each other such that at least a portion of opening 260 overlaps at least a portion of opening 264.

In one embodiment, opening 260 and opening 264 can overlap substantially orthogonally in the nominal center of the device 220 as shown in FIG. 6. In another embodiment, opening 260 and opening 264 can be positioned such that the angle of overlap is less or more than 90 degrees. In the embodiment shown in FIG. 6, opening 260 and opening 264 each can be substantially oblong shaped. In other embodiments, opening 260 and opening 264 can be circular, rectangular, square or any other suitable shape. In other embodiments, opening 260 and opening 264 can be positioned at a location on first link 228 and second link 232, respectively, other than the nominal center.

Manipulandum 222 can be a unitarily formed component of an input device such as a joystick, a knob, a mouse, a steering wheel, a game pad, and the like, or alternatively can be separate multiple components of such an input device. In the embodiment shown in FIG. 6, manipulandum 222 extends through opening 260 of first link 228 and opening 264 of second link 232. In this configuration, manipulandum 222 can move in two directions or two degrees of freedom. In other words, during operation, manipulandum 222 can be constrained by opening 260 of first link 228 while being permitted to move freely within opening 264 of second link 232, and can be constrained by opening 264 of second link 232 while being permitted to move freely within opening 260 of first link 228. Input from a user can be transmitted through the manipulandum 222 and to a processor coupled to the user interface device 220. Likewise, force feedback signals can be communicated from the processor to the first actuator 236 and the second actuator 240 to provide force feedback to a user via manipulandum 222.

In the embodiment shown in FIG. 6, first link 228 is a compliant member coupled to first actuator 236, and second link 232 is a compliant member coupled to second actuator 240. First link 228 and second link 232 may be constructed of one or more compliant materials, such as plastic, rubber or other suitable material. During operation, first link 228 flexes laterally when first link 228 is actuated by rotational forces of first actuator 236, and second link 232 flexes laterally when second link 232 is actuated by rotational forces of second actuator 240.

Figure 7:
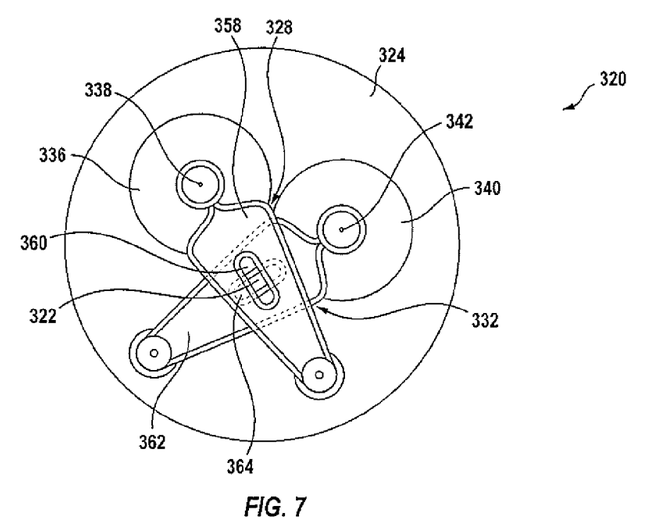
FIG. 7 is a partial top view of a user interface device according to an embodiment of the invention.

FIG. 7 is a partial top view of a user interface device according to yet another embodiment of the invention. User interface device 320 includes a manipulandum 322 moveable about a first direction or first degree of freedom, and a second direction or second degree of freedom, a first link 328 coupled to a ground member 324, a second link 332 coupled to the ground member 324, a first actuator 336, and a second actuator 340.

The first actuator 336 is rotatable about a drive axis 338 and is configured to engage the first link 328, and the second actuator 340 is rotatable about a drive axis 342 and is configured to engage the second link 332. The drive axis 338 of the first actuator 336 is substantially parallel to the drive axis 342 of the second actuator 340. In this configuration, the first actuator 336 can drive the first link 328 and the second actuator 340 can drive the second link 332 in two separate planes or separate non-coincident locations such that operation of the first link 328 does not interfere with operation of the second link 332.

In the embodiment shown in FIG. 7, first link 328 includes a cable structure coupled to first actuator 336, and second link 332 includes a cable structure coupled to second actuator 340. First link 328 and second link 332 may be constructed of plastic, metal or any other suitable material. During operation, the cable structure of first link 328 allows first link 328 to translate laterally when first link 328 is actuated by rotational forces of first actuator 336, and the cable structure of second link 332 allows second link 332 to translate laterally when second link 332 is actuated by rotational forces of second actuator 340.

As shown in FIG. 7, first link 328 includes a surface 358 defining an opening 360, and second link 332 includes a surface 362 defining an opening 364. The positioning of first link 328 and second link 332 within separate planes or separate non-coincident locations enables first link 328 and second link 332 to be positioned relative to each other such that at least a portion of opening 360 overlaps at least a portion of opening 364.

In one embodiment, opening 360 and opening 364 can overlap substantially orthogonally in the nominal center of the device 320 as shown in FIG. 7. In another embodiment, opening 360 and opening 364 can be positioned such that the angle of overlap is less or more than 90 degrees. In the embodiment shown in FIG. 7, opening 360 and opening 364 each can be substantially oblong shaped. In other embodiments, opening 360 and opening 364 can be circular, rectangular, square or any other suitable shape. In other embodiments, opening 360 and opening 364 can be positioned at a location on first link 328 and second link 332, respectively, other than the nominal center.

Manipulandum 322 can be a unitarily formed component of an input device such as a joystick, a mouse, a steering wheel, a game pad, and the like, or alternatively can be multiple separate components of such an input device. In the embodiment shown in FIG. 7, manipulandum 322 extends through opening 360 of first link 328 and opening 364 of second link 332. In this configuration, manipulandum 322 can move in two directions or two degrees of freedom. In other words, during operation, manipulandum 322 can be constrained by opening 360 of first link 328 while being permitted to move freely within opening 364 of second link 332, and can be constrained by opening 364 of second link 332 while being permitted to move freely within opening 360 of first link 328. Input from a user can be transmitted through the manipulandum 322 and to a processor coupled to user interface device 320. Likewise, force feedback signals can be communicated from the processor to the first actuator 336 and the second actuator 340 to provide force feedback to a user via manipulandum 322.

Figure 8:
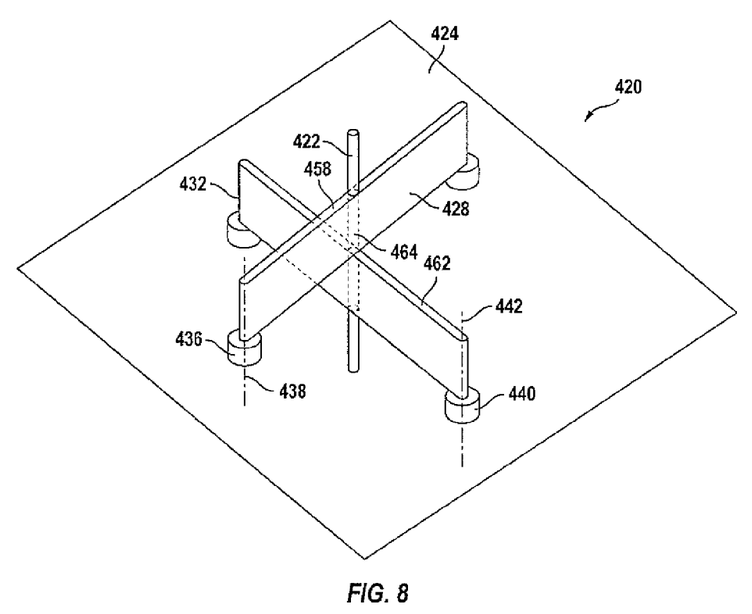
FIG. 8 is a partial perspective view of a user interface device according to an embodiment of the invention.

FIG. 8 is a partial perspective view of a user interface device according to an embodiment of the invention. User interface device 420 includes a manipulandum 422 moveable about a first direction or first degree of freedom and a second direction or second degree of freedom, a first link 428, a second link 432, a first actuator 436, and a second actuator 440. The first link 428 and the second link 432 are each coupled to a ground member 424, for example, by a post member or other suitable coupling.

The first actuator 436 is rotatable about a drive axis 438 and is coupled to the first link 428, and the second actuator 440 is rotatable about a drive axis 442 and is coupled to the second link 432. The drive axis 438 of the first actuator 436 is substantially parallel to the drive axis 442 of the second actuator 440. In this configuration, the first actuator 436 can drive the first link 428 and the second actuator 440 can drive the second link 432 in two separate planes or separate non-coincident locations such that operation of the first link 428 does not interfere with operation of the second link 432.

As shown in FIG. 8, first link 428 is a compliant member coupled to first actuator 436 and second link 432 is a compliant member coupled to second actuator 440. First link 428 and second link 432 may be constructed of a material, such as plastic, rubber, or other suitable material that provides relatively high compliance in one direction, but relatively high stiffness or rigidity in another direction. Thus, in the embodiment shown in FIG. 8, first link 428 and second link 432 provide flexure about their associated pivot axes in a lateral or horizontal direction, but are substantially rigid in a vertical direction.

As shown in FIG. 8, first link 428 includes a surface 458 defining an opening 460, and second link 432 includes a surface 462 defining an opening 464. The positioning of first link 428 and second link 432 in separate planes or separate non-coincident locations enables first link 428 and second link 432 to be positioned relative to each other such that at least a portion of opening 460 overlaps at least a portion of opening 464.

In one embodiment, opening 460 and opening 464 can overlap substantially orthogonally in the nominal center of the device 420 as shown in FIG. 8. In another embodiment, opening 440 and opening 464 can be positioned such that the angle of overlap is less or more than 90 degrees. In the embodiment shown in FIG. 8, opening 460 and opening 464 each can be substantially circular shaped as shown in FIG. 8. In other embodiments, opening 460 and opening 464 can be oblong or oval, rectangular, square or any other suitable shape. In other embodiments, opening 460 and opening 464 can be positioned at a location on first link 428 and second link 432, respectively, other than the nominal center.

Manipulandum 422 can be a unitarily formed component of an input device such as a joystick, a mouse, a steering wheel, a game pad, and the like, or alternatively can be multiple separate components of such an input device. In the embodiment shown in FIG. 8, manipulandum 422 extends through opening 460 of first link 428 and opening 464 of second link 432. In this configuration, manipulandum 422 can move in two directions or two degrees of freedom. In other words, during operation, manipulandum 422 can be constrained by opening 460 of first link 428 while being permitted to move freely within opening 464 of second link 432, and can be constrained by opening 464 of second link 432 while being permitted to move freely within opening 460 of first link 428. Input from a user can be transmitted through the manipulandum 422 and to a processor coupled to user interface device 420. Likewise, force feedback signals can be communicated from the processor to the first actuator 436 and the second actuator 440 to provide force feedback to a user via manipulandum 422.

In an alternative embodiment, first actuator 436 and second actuator 440 can be configured to move relative to ground member 424. In such an embodiment, ground member 424, for example, may define slots in which first actuator 436 and second actuator 440 can traverse to allow some play or range of motion when actuators 436 and/or 440 traverse. Alternatively, ground member 424, for example, may define slots adjacent to the coupling of first link 428 and the coupling of second link 432 in which the coupling of first link 428 and the coupling of second link 432 can traverse.

Although not specifically described above, the user interface device 20 (120, 220, 320, 420) can be used in conjunction with a variety of applications. For example, the user interface device 20 can be used in conjunction with a home computer, computer-controlled games, simulations, vehicle controls, and/or other computer-assisted applications. Thus, the user interface device 20 may be communicatively coupled to a processor (not shown), such as a computer processing unit (CPU) or other host computer, configured to receive and/or transmit signals to the manipulandum 20 through its connection with the first actuator 36 and the second actuator 40 or from the manipulandum 20 through sensors described below.

Sensors (not shown) can also be used in conjunction with the user interface device 20. Sensors can be coupled to manipulandum 22 and configured to sense a position of the manipulandum in at least one of the degrees of freedom. The sensors can be configured to output a sensor signal based on the position of the manipulandum to the host computer or other processor. A sensor can be, for example, a strain gauge configured to measure a strain associated with input received from the manipulandum 22, and/or a force sensor configured to measure a magnitude of a force input from the manipulandum 22.

In other embodiments, a sensor can include, for example, relative optical encoders that provide signals to measure the movement of the manipulandum 22. Other types of sensors can also be used such as, for example, a potentiometer, a Hall effect sensor, a resolver, a load cell, a force sensitive resistor, a MEMS micro strain sensor, a resistive sensor, a piezoelectric sensor, an LVDT, an RVDT, a capacitive sensor, or other analog or digital sensor. The sensor can be an absolute or relative sensor.

As discussed above, the force signals provided to the user interface device 20 from a processor can correspond to applications being executed on the processor. As an event occurs within the application, an appropriate force signal related to that event can be sent to the user interface device 20 so that the appropriate type of force feedback is output. The force feedback output by manipulandum 22 may be a variety of different types. For example, force feedback output by the manipulandum 22 can include springs, dampers, textures, vibrations, detents, jolts or pulses, inertia, friction, obstructions, dynamic forces and the like. The force feedback effects can be integrally implemented with the functions performed by the manipulandum. Other force feedback effects can only be output using active actuators.

A basic force sensation includes force detents that are output at particular predefined or regularly-spaced positions of the manipulandum 22 to designate particular positions of the manipulandum 22. The force feedback detents can be simple jolt or bump forces output in commanded directions to indicate a detent position or mark a particular position of the manipulandum 22. The detents can include forces that attract the manipulandum 22 to the particular position and/or resist movement of the manipulandum 22 away from that position.

Another type of force feedback is a spring force, The spring force can provide resistance to movement of the manipulandum 22 to simulate a physical spring between the manipulandum 22 and ground. This can be used to snap back the manipulandum 22 to its at rest or center position after the user lets go of the manipulandum 22. A damping force can also be provided to slow down the motion of manipulandum 22.

A "hill" effect can also be used in some embodiments, The hill effect acts as an increasingly resistive force until the "peak" of the hill is reached, after which point the force assists the user to continue to move away from the peak.

A barrier force feedback conveys to the user that the manipulandum 22 has reached a limit to its motion and physically blocks the manipulandum 22, either partially or totally, from moving to the positions behind the barrier.

Other force feedback can be output to inform the user of ends of travel of the manipulandum 22. For example, a jolt force can be output that is stronger in magnitude than normal detents, which informs the user that the end of a value range or other range has been reached.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A device, comprising:
a manipulandum moveable in at least a first degree of freedom and a second degree of freedom;
a first link including a gear portion, the first link pivotally coupled to a ground member at a first pivot axis, the first pivot axis associated with the first degree of freedom;
a second link including a gear portion, the second link pivotally coupled to the ground member at a second pivot axis, the second pivot axis associated with the second degree of freedom, the second pivot axis is substantially parallel to the first pivot axis;
a first actuator configured to engage the gear portion of the first link and to provide an output about a drive axis; and
a second actuator configured to engage the gear portion of the second link and to provide an output about a drive axis, the first actuator and the second actuator each configured to receive a signal associated with a force feedback, the force feedback being associated with the manipulandum.

2. The device of claim 1, wherein the drive axis associated with the first actuator is substantially parallel to the drive axis associated with the second actuator.

3. The device of claim 1, wherein the first link includes a surface defining an opening, the second link includes a surface defining an opening, the first link being disposed with a plane, the second link being disposed with a plane different from the plane associated with the first link, at least a portion of the opening of the first link and at least a portion of the opening of the second link overlapping.

4. The device of claim 1, wherein the first link includes a surface defining an opening, the second link includes a surface defining an opening, the linear distance between the first pivot axis and the drive axis associated with the first actuator is greater than the linear distance between the first pivot axis and the center of the opening of the first link, the linear distance between the second pivot axis and the drive axis associated with the second actuator is greater than the linear distance between the second pivot axis and the center of the opening of the second link.

5. The device of claim 1, further comprising a first drive gear coupled to the first actuator; and
a second drive gear coupled to the second actuator, the first link having a radius of rotation greater than the radius of rotation of the first drive gear, the second link having a radius of rotation greater than the radius of rotation of the second drive gear.

6. The device of claim 1, wherein the first link includes a first surface defining an opening and a second surface defining an opening, the opening of the second surface of the first link being smaller than the opening of the first surface of the first link, the second link includes a first surface defining an opening and a second surface defining an opening, the opening of the second surface of the second link being smaller than the opening of the first surface of the second link, movement of the manipulandum being constrained by the opening of the second surface of the first link and the opening of the second surface of the second link.

7. A mechanism, comprising:
a ground member;
a first link pivotally coupled to the ground member about a first pivot axis and configured to provide a degree of freedom associated with a manipulandum, the first link including a surface defining an opening; and
a second link pivotally coupled to the ground member about a second pivot axis and configured to provide a degree of freedom associated with the manipulandum different from the degree of freedom associated with the first link, the second link including a surface defining an opening, the first link being disposed with a plane, the second link being disposed with a plane different from the plane associated with the first link, at least a portion of the opening of the first link and at least a portion of the opening of the second link overlapping, the first pivot axis being substantially parallel to the second pivot axis.

8. The mechanism of claim 7, wherein the first link and the second link each include a gear portion.

9. The mechanism of claim 7, wherein the first link and the second link each include a compliant member.

10. The mechanism of claim 7, wherein the first link and the second link each include a cable member.

11. The mechanism of claim 7, the surface of the first link being a first surface of the first link, the surface of the second link being a first surface of the second link, wherein the first link includes a second surface defining an opening, the opening of the second surface of the first link being smaller than the opening of the first surface of the first link, the second link includes a second surface defining an opening, the opening of the second surface of the second link being smaller than the opening of the first surface of the second link, movement of the manipulandum being constrained by the opening of the second surface of the first link and the opening of the second surface of the second link.

12. The mechanism of claim 7, wherein the opening of the first link and the opening of the second link each is substantially oblong.

13. The mechanism of claim 7, wherein the opening of the first link and the opening of the second link each is substantially curvilinear shaped.

14. A device, comprising:
a manipulandum moveable in at least two degrees of freedom;
a first link rotatably moveable about a pivot axis;
a second link rotatably moveable about a pivot axis, the first link and the second link coupled to a ground member;
a first actuator configured to engage the first link and provide an output about a drive axis of the first actuator; and
a second actuator configured to engage the second link and provide an output about a drive axis of the second actuator, the drive axis of the first actuator being substantially parallel to the drive axis of the second actuator, the first actuator and the second actuator each configured to receive a signal associated with a force feedback, the force feedback being associated with the manipulandum.

15. The device of claim 14, wherein the first link includes a surface defining an opening, the second link includes a surface defining an opening, the first link being disposed with a plane, the second link being disposed with a plane different from the plane associated with the first link, at least a portion of the opening of the first link and at least a portion of the opening of the second link overlapping.

16. The device of claim 14, further comprising an output shaft slidably coupled to the first link and the second link; and
a third actuator configured to provide an output about a drive axis of the third actuator, the manipulandum being moveable in a third degree of freedom.

17. The device of claim 14, further comprising a sensor coupled to the manipulandum configured to sense a position of the manipulandum in at least one of the degrees of freedom, the sensor configured to output a sensor signal based on the position of the manipulandum, the sensor signal being provided to a host computer.

18. The device of claim 14, further comprising:
a drive gear associated with the first actuator; and
a drive gear associated with the second actuator, the first link including a gear portion configured to engage the drive gear of the first actuator, the second link including a gear portion configured to engage the drive gear of the second actuator, the first link having a radius of rotation greater than the radius of rotation of the drive gear associated with the first actuator, the second link having a radius of rotation greater than the radius of rotation of the drive gear associated with the second actuator.

19. The device of claim 14, wherein the first link is a compliant member, the second link is a compliant member different from the compliant member of the first link.

20. The device of claim 14, wherein the first link is a cable member, the second link is a cable member different from the cable member of the first link.

* * * * *